US008080288B2

(12) United States Patent
Van Raemdonck

(10) Patent No.: US 8,080,288 B2
(45) Date of Patent: Dec. 20, 2011

(54) METHOD FOR PREPARING THERMOSETTING OR THERMOPLASTIC POLYMER OR ELASTOMER COMPOSITES THAT ARE REINFORCED WITH NATURAL FIBERS, AND THEIR MULTIPLE APPLICATIONS AS CONSTRUCTION MATERIAL

(75) Inventor: Joris Van Raemdonck, Kruibeke (BE)

(73) Assignee: Lineo NV (BE)

( * ) Notice: Subject to any disclaimer, the term of this patent is extended or adjusted under 35 U.S.C. 154(b) by 716 days.

(21) Appl. No.: 12/065,460

(22) PCT Filed: Sep. 4, 2006

(86) PCT No.: PCT/EP2006/008602
§ 371 (c)(1),
(2), (4) Date: Feb. 29, 2008

(87) PCT Pub. No.: WO2007/025782
PCT Pub. Date: Mar. 8, 2007

(65) Prior Publication Data
US 2008/0206537 A1 Aug. 28, 2008

(30) Foreign Application Priority Data
Sep. 2, 2005 (BE) .................. 2005/0424

(51) Int. Cl.
*B05D 3/02* (2006.01)
*B05D 1/18* (2006.01)
*B32B 27/04* (2006.01)
*B32B 27/38* (2006.01)
(52) U.S. Cl. ............... 427/392; 427/385.5; 427/386; 427/387; 427/389.9; 427/439; 428/297.4; 428/413
(58) Field of Classification Search .................. None
See application file for complete search history.

(56) References Cited

U.S. PATENT DOCUMENTS

| 3,019,076 | A | * | 1/1962 | Pardo, Jr. et al. | 8/127.6 |
| 3,102,835 | A | * | 9/1963 | White | 264/109 |
| 5,916,798 | A | * | 6/1999 | Lund et al. | 435/263 |
| 6,265,333 | B1 | * | 7/2001 | Dzenis et al. | 442/346 |
| 2002/0176979 | A1 | | 11/2002 | Evans | |
| 2005/0245161 | A1 | * | 11/2005 | Sain et al. | 442/374 |

FOREIGN PATENT DOCUMENTS

| DE | 42 28 606 | 3/1994 |
| EP | 1 582 344 | 10/2005 |
| FR | 2 492 476 | 4/1982 |
| GB | 501649 | 2/1939 |
| GB | 502409 | 3/1939 |
| GB | 2 277 537 | 11/1994 |
| GB | 2 322 099 | 8/1998 |
| WO | WO 02/08316 | 1/2002 |

OTHER PUBLICATIONS

United States Standards for Grades of Wool, provided by the USDA (1968).*
Hepworth, et al. "The Penetration of Epoxy Resin into Plant Fibre Cell Walls Increases the Stiffness of Plant Fibre Composites," *Composites Part A: Applied Science and Manufacturing*, vol. 31, No. 6, pp. 599-601, Jun. 2000.
Anonymous, "Fighter Fuselage in Plastic," *Aircraft Production; Aircraft Production Jul. 1945 London, England*, vol. 7, No. 81, pp. 323-326, Jul. 1945.
International Search Report dated Dec. 18, 2006.

* cited by examiner

*Primary Examiner* — Michael J Feely
(74) *Attorney, Agent, or Firm* — Knobbe, Martens, Olson & Bear LLP

(57) ABSTRACT

Methods for preparing thermosetting or thermoplastic polymer or elastomer composites that are reinforced with natural fibers are disclosed. A thermosetting or thermoplastic polymer or elastomer composite that is reinforced with natural fibers obtainable by the disclosed method is also disclosed. Construction material that is obtainable by hardening a thermosetting or thermoplastic polymer or elastomer composite that is reinforced with natural fibers is described.

13 Claims, No Drawings

METHOD FOR PREPARING THERMOSETTING OR THERMOPLASTIC POLYMER OR ELASTOMER COMPOSITES THAT ARE REINFORCED WITH NATURAL FIBERS, AND THEIR MULTIPLE APPLICATIONS AS CONSTRUCTION MATERIAL

CROSS-REFERENCE TO RELATED APPLICATIONS

This application is the U.S. National Phase under 35 U.S.C. §371 of International Application PCT/EP2006/008602, filed Sep. 4, 2006, which claims priority to BE 2005/0424, filed Sep. 2, 2005.

The present invention relates to a method for preparing thermosetting or thermoplastic polymer or elastomer composites that are reinforced with natural fibers and their multiple applications as construction material. These composites may be biodegradable or non-biodegradable.

Since many years there is a trend to use renewable raw materials as construction material. Composite materials comprising natural fibers based on such renewable products are known.

A problem of known methods for preparing such composite materials comprising natural fibers is that besides cellulose and hemicellulose compounds also lignin and pectin compounds are present in these natural fibers which hamper a suitable attachment of the composite to a matrix. Therefore, in the prior art, there have been attempts to modify the cellulose compounds and/or to chemically adapt the composite compounds. However, these known methods have all shown to be insufficient, such that their application on the market has remained limited.

The present invention provides composites comprising natural fibers with a broad field of application as construction material, which permits to at least partially resolve these problems.

More in particular, the present invention provides a method for preparing a new construction material that is essentially made of renewable natural fibers, such as flax and other natural fibers.

To this end, the invention provides a method for preparing thermosetting or thermoplastic polymer or elastomer composites that are reinforced with fibers, preferably natural fibers, comprising bringing a thermosetting or thermoplastic polymer or elastomer compound into contact with a cellulose- or hemicellulose-containing material in the presence of a carrier solvent or a carrier emulsion during a sufficient long period of time in order to allow absorption and adsorption of the thermosetting or thermoplastic polymer or elastomer compound to and in the cellulose- or hemicellulose-containing material, whereby said material completely or essentially consists of fibers, preferably fibers that are partly or essentially natural fibers, and more preferably fibers derived from flax or a flax product, and that have an average diameter comprised between 1 µm and 4 mm, and for instance between 3 µm and 4 mm, or between 10 µm and 4 mm, thereby obtaining a product. The method may further comprise processing of the obtained product to a thermosetting or a thermoplastic polymer or elastomer composite that is reinforced with said fibers. Said composites may be biodegradable or non-biodegradable. Also said thermosetting or thermoplastic polymer or elastomer compounds may be biodegradable or non-biodegradable.

In a preferred embodiment, the invention provides a method for preparing thermosetting or thermoplastic polymer or elastomer composites that are reinforced with natural fibers, comprising bringing a thermosetting or thermoplastic polymer or elastomer compound into contact with a cellulose- or hemicellulose-containing material in the presence of a carrier solvent or a carrier emulsion during a sufficient long period of time in order to allow absorption and adsorption of the thermosetting or thermoplastic polymer or elastomer compound to and in the cellulose- or hemicellulose-containing material, whereby said material completely or essentially consists of natural fibers that have an average diameter comprised between 1 µm and 4 mm and for instance between 3 µm and 4 mm, or between 10 µm and 4 mm, thereby obtaining a product, followed by further processing the obtained product to a thermosetting or a thermoplastic polymer or elastomer composite that is reinforced with natural fibers.

The used natural fibers may originate from any possible renewable source such as hemp, jute, bamboo, coco, sisal, and preferably flax. In a preferred embodiment, the cellulose- and hemicellulose-containing material is a flax product. In another preferred embodiment, said natural fibers essentially consist of a flax product. The flax product may be applied in all kind of its forms, and may for instance comprise: green flax, retted flax, flax in bulk, ribbons, wicks, yarns in all possible forms, which yarns may be simple yarns or yarns that are spun in any type of textile structures, and/or which may be twined, whereby the textile structures may be non wovens, fabrics, knitted fabrics, braid fabrics, laid fabrics, ties, which are unidirectional or multidirectional.

All these textile structures may also be formed by mixtures of natural fibers with any type of usable fibers, for instance any type of man-made fibers. The natural and other fibers (e.g. man-made or synthetic fibers) can be mixtures of each other. The natural fibers and other usable fibers may be applied as such and the textile structure may be made by both types of fibers. Alternatively or in combination therewith, mixtures of natural fibers and other usable fibers can be used for making the textile fibers.

The present method can be applied when using dry as well as wet flax, but in case wet flax is used, preferably use is made of flax having an absolute moisture content of between 4% and 10%.

In another preferred embodiment, the invention relates to a method, wherein the natural fiber is provided with one or more additives, said additives being selected from the group comprising anti-aging compounds, anti-flammable compounds, and/or UV-resistance compounds. Such additives are well known in the art and will not be described into detail herein.

Depending on the desired end product, the flax raw material may be used with any kind of synthetic fibers to provide additional features to the end product. In a preferred embodiment, another fiber may therefore also be mixed with the natural fiber, including preferably aramide, ceramic, metal, glass, polyethylene, polyester, carbon and/or another natural fiber material.

In another embodiment, the method may comprise mixing different textile structures that are made of natural fibers, as defined herein, and/or another (synthetic) fiber, as disclosed above. According to the present invention it will be understood that the natural fibers as defined herein can be mixed or combined with other types of fibers, e.g. aramide, ceramic, metal, glass, polyethylene, polyester, carbon and/or another natural fiber material, in one fiber. Alternatively a mixture of separate natural fibers as defined herein and separate other fibers, e.g. aramide, ceramic, metal, glass, polyethylene, polyester, carbon and/or another natural fiber material, as disclosed herein can be used.

To obtain thermosetting or thermoplastic polymer or elastomer composites that are reinforced with natural fibers having a low density and having very good mechanical properties, such as a high stiffness, it is in general necessary that the forces of a fiber can be transferred to other fibers, such that all fibers work together. In the present invention, this force transfer is done by a specifically developed resin, in particular a thermosetting or thermoplastic resin, biodegradable or not, and preferably an epoxy resin. Such resin however needs to make a very good binding with the fibers. In the prior art it is however known that this may induce problems, especially when using natural fibers, for which up to now no suitable solutions are available, such that such natural fibers are up to now not substantially used for the manufacturing of high strength construction elements. In the present invention, a solution has been found for this problem.

The present method essentially consists of a method for bringing a thermosetting or thermoplastic resin polymer or elastomer compound—biodegradable or not—also named resin, such as preferably epoxy resins, in the neighborhood of the free hydroxyl groups of cellulose- and hemicellulose-containing compounds, such that these compounds react with the resin or are anchored in the resin, such that a good binding is obtained between flax (fibers) and the thermosetting or thermoplastic resin.

More in particular, the present method enables to obtain molecular connections between the resin, being a thermosetting or thermoplastic resin, and the cellulose- or hemicellulose-containing material in order to obtain a good adherence of the resin as internal matrix to the cellulose- or hemicellulose-containing compounds present in the natural fibers. Such method also permits to obtain this kind of molecular connections without harming the mechanical and/or physical properties of the natural fibers.

For this purpose, a carrier solvent or a carrier emulsion is used, which couples the thermosetting or thermoplastic resin to the free hydroxyl groups of the cellulose and/or hemicellulose. The thermosetting or thermoplastic resin changes in the presence of the carrier solvent or carrier emulsion in dissolved resin, which can be absorbed and adsorbed to the flax fibers. Use of a carrier solvent or of a carrier emulsion thus permits not only to at least partially dissolve the thermosetting or thermoplastic resin, but also induces adherence of this (dissolved) resin to the hydroxyl groups of the cellulose- or hemicellulose-containing compounds of the natural fibers.

The carrier solvent and/or carrier emulsion may comprise any compound which is capable of adsorbing and/or absorbing natural fibers. The carrier solvent and/or carrier emulsion are preferably chosen from water, alcohols or mixtures thereof and/or ketones or mixtures thereof. The solvent or emulsion may thus comprise water or one or more alcohols or one or more ketones, or a mixture of water and one or more alcohols, or a mixture of water and one or more ketones, or a mixture of one or more ketones and one or more alcohols. Preferably the alcohols and/or ketones have a low molecular weight. The alcohols and/or ketones may be linear or aromatic and preferably comprise between 1 and 12 carbon atoms, and for instance between 6 carbon atoms. Non-limitative examples of alcohols which are suitable for use as carrier solvent or carrier emulsion include methanol, ethanol, propanol, isopropanol, butanol, isobutanol, sec-butanol, tert-butanol, 1-pentanol (amyl alcohol), 3-methyl-1-butanol (isoamyl alcohol), 2-methyl-1-butanol, 2,2-dimethyl-1-propanol, 3-pentanol, 2-pentanol, 3-methyl-2-butanol, 2-methyl-2-butanol, 1-hexanol, 2-hexanol, 3-hexanol, isohexanol, sec-hexanol, tert-hexanol, etc. . . . Non-limitative examples of ketones which are suitable for use as carrier solvent or carrier emulsion include acetone, methyl ethyl ketone (MEK), diethyl ketone and methyl isobutyl ketone, methyl propyl ketone. Particularly suitable are for instance acetone and MEK.

The terms "thermoset", "thermosetting" and "thermohardeners" are used herein as synonyms. Non-limitative examples of thermosetting materials comprise for instance polyesters, epoxies, epoxy resins, and polyurethanes, and the like. The term "thermoplast" and "thermoplastic" are used herein as synonyms. Non-limitative examples of thermoplastic materials comprise for instance polyolefines, such as polyethylene and polypropyl, poly (vinyl chloride) (PVC), polystyrene, and the like.

The thermosetting or thermoplastic polymer compounds are preferably chosen from the group comprising: epoxies, epoxies mixed with a hardener, polyesters, vinyl esters, polyurethanes, furan resins, silicones, polyolefins comprising polyethylene and polypropylene, poly (vinyl chloride) (PVC), styrene polymers including polystyrene, styrene acrylonitrile, and acrylonitrile-butadiene-styrene, polyamides, polyacrylates, polycarbonates and/or combinations thereof. In a particularly preferred embodiment, the compounds are epoxies or epoxies mixed with a hardener, which hardener is in general an amine.

The term "elastomer" is used herein interchangeably with the term "rubber". Elastomers include amorphous polymers existing above their glass transition temperature. At ambient temperatures rubbers are thus relatively soft and deformable. Elastomers can be thermosets (requiring vulcanization) but may also be thermoplastic. A thermoplastic elastomer is a material which is both a thermoplastic (i.e., can be melted and cooled to the same state) and an elastomer (i.e., rubbery). The long polymer chains cross-link during curing and account for the flexible nature of the material. Non-limitative examples of elastomers for use in the present invention may comprise natural rubber, polyisoprene, butyl rubber (copolymer of isobutylene and isoprene), polybutadiene, styrene butadiene rubber or SBR (copolymer of polystyrene and polybutadiene), nitrile rubber (copolymer of polybutadiene and acrylonitrile) also called buna N rubbers, chloroprene rubber, polychloroprene, also called Neoprene, silicone RTV, copolymers of vinylidene fluoride and hexafluoropropylene, fluorosilicone rubber, EPM and EPDM rubber (ethylene propylene rubber, a copolymer of polyethylene and polypropylene), polyurethane rubber, resilin, polyacrylic rubber (ABR), epichlorohydrin rubber (ECO), polysulfide rubber, chlorosulfonated polyethylene (CSM), and/or combinations thereof. In an embodiment, the elastomer compounds may be mixed with a hardener.

In another embodiment, the thermosetting or thermoplastic polymer or elastomer as used herein is a monomer. Also combinations of polymeric and monomeric polymers and/or elastomers may be used according to the present invention.

As used herein, in some embodiments, the term "resin" may thus refer to polymer or elastomer resin.

The resin may be added and brought into contact with the cellulose- and hemicellulose-containing material under the form of a solution or under the form of a colloidal suspension. The resin can be provided with or without a hardener depending on the desired final application and/or the desired processing techniques of an end user of this new raw material.

In an embodiment of the present method, the thermosetting or thermoplastic polymer or elastomer may be provided with a hardener. In another embodiment of the present method, the thermosetting or thermoplastic polymer or elastomer may be provided with a suitable catalyst. Non-limiting examples of suitable catalysts may include peroxide-based catalysts, e.g. a hydrogen peroxide catalyst. Optionally one or more catalyst enhancers may be added. Such enhancers are well known in the art and will not be further described herein.

The present method may comprise adsorption and/or absorption of the resin or polymer or elastomer compound without a hardener or without catalyst by or to the natural fibers. In a further step the method may comprise a further treatment with a thermosetting polymer or elastomer compound that is optionally provided with a hardener or a catalyst.

Alternatively, in another embodiment, the method may comprise adsorption and/or absorption of the hardener or catalyst without resin or polymer or elastomer compound by or to the natural fibers. In a further step, the method may comprise a treatment with a thermosetting polymer or elastomer compound that is optionally provided with a hardener or a catalyst.

In a next embodiment, the method comprises the step of releasing the excess of carrier solvent or carrier emulsion of the obtained product after complete or partial absorption and adsorption of the thermosetting or thermoplastic polymer or elastomer compound to the cellulose- and hemicellulose-containing material for instance by drying at temperatures of for instance room temperature to 180° C. and preferably to 200° C. The next step according to the invention is preferably a drying process whereby the carrier solvent or the carrier emulsion is removed and the resin remains in place, and in the case the resin is a prepreg resin, this resin is brought in the b-stage during the drying process at temperatures of preferably room temperature to 180° C. and preferably to 200° C. In a preferred embodiment, the method may involve drying under vacuum at a temperature comprised between room temperature and 180° C., and preferably 200° C. In another embodiment, the method may involve drying by lyophylisation. In yet another embodiment, the method may involve drying using high frequent radiation, infra red, and the like.

In a following embodiment, the present invention relates to a method, whereby the thermosetting or thermoplastic polymer or elastomer composite that is reinforced with natural fibers is provided with a further treatment with a thermosetting polymer or elastomer compound that is provided with a hardener. Such additionally treated composite is also called "prepreg" herein.

The invention is also directed to a roll or a layer of thermosetting or thermoplastic polymer or elastomer composite that is reinforced with natural fibers obtainable by the present method, and having a width comprised between 1 and 600 cm, and preferably of 1, 5, 10, 15, 20, 25, 30, 40, 50, 60, 70, 80, 90, 100, 120, 150, 200, 250, 300, 350, 400, 450, 500, 550 or 600 cm and a length when rolled out comprised between 1 and 1000 m, and preferably of 1, 2, 10, 20, 50, 100, 200, 350, 400, 500, 650, 750, 850, 900 or 1000 m.

Such roll or layer of thermosetting or thermoplastic polymer or elastomer composite that is reinforced with natural fibers comprises 15-70 volume % and for instance 25-70, 35-70 or 40-70 volume % of fiber, essentially a natural fiber, and 85-30 volume % and for instance 75-30, 65-30, or 60-30 volume % of a thermosetting or thermoplastic polymer or elastomer compound that is optionally provided with a hardener, whereby the fiber length of the natural fiber preferably is at least 1 mm, and for instance at least 3, 5, 8, 10, 12, or 15 mm, and whereby preferably most of the used fibers have a length comprised between 120 mm and 4000 mm, and for instance of between 120 mm and 3000 mm, 120 mm and 2000 mm, 120 mm and 1000 mm, 120 mm and 750 mm, 120 mm and 500 mm, or 120 mm and 250 mm.

The invention further relates in another embodiment to a method wherein the fibers are treated and/or wherein the fibers and/or all possible textile structures are sized with the herein disclosed process.

The invention further relates in yet another embodiment to a method wherein nano tubes are added to the polymer, resin or elastomer compound. The invention also relates to a method wherein natural fibers are combined with carbon fibers in hybrid.

In another embodiment, the invention relates to a laminate material of which at least one layer consists of a thermosetting or thermoplastic polymer or elastomer composite that is reinforced with natural fibers according to the invention, which is or is not subjected to an additional treatment with a thermosetting polymer or elastomer compound provided with a hardener. In a preferred embodiment, the invention relates to a laminate material of which the above-mentioned layer forms an intermediate layer in the laminate material, said layer consisting of a thermosetting or thermoplastic polymer or elastomer composite that is reinforced with natural fibers according to the invention, which has or has not subjected to an additional treatment with a thermosetting polymer or elastomer compound provided with a hardener. In still another embodiment, various layers of a laminate material can also consist of different layers of a thermosetting or thermoplastic polymer or elastomer composite that is reinforced with natural fibers, which has or has not subjected to an additional treatment with a thermosetting polymer or elastomer compound provided with a hardener. The present laminate materials are particularly suitable as amongst others construction or building elements, for instance for tubes, plates, beams, etc.

Furthermore, the invention also relates to a construction material obtainable by hardening a thermosetting or thermoplastic polymer or elastomer composite material obtainable by the present method and optionally provided in laminated form, consisting of 15-70 volume % and for instance 25-70, 35-70 or 40-70 volume % of fiber, essentially a natural fiber, and 85-30 volume % and for instance 75-30, 65-30 volume % of a thermosetting or thermoplastic polymer or elastomer compound that is optionally provided with a hardener, or obtainable by hardening of fractions of a roll or layer thereof.

In another embodiment, the invention relates to a construction material that comprises layers of carbon fibers and layers of natural fibers and/or layers of carbon fibers that are mixed with natural fibers. The construction material may comprise layers of carbon fibers, and layers of natural fibers that are obtained by hardening a thermosetting or thermoplastic polymer or elastomer composite that is reinforced with natural fibers according to a method of the invention. Alternatively or in combination therewith, the construction may also comprise layers of carbon fibers that are mixed with natural fibers and that are obtained by hardening a thermosetting or thermoplastic polymer or elastomer composite that is reinforced with carbon and natural fibers according to a method of the invention.

As previously mentioned, it is an advantage of the present invention that a construction material is obtained having a low density and having very good mechanical properties such as a high stiffness. More in particular, the present construction material has the important characteristic of being a smooth material, that is optionally offered on a roll or layer that can be used to produce, after a specific additional treatment, stiff products having very high tearing strength and stiffness and a very low weight. The present construction material may be applied in fields of application wherein light, stiff and strong constructions are required. In an embodiment, the invention therefore also relates to a mechanical construction made of a construction material as defined herein Examples of such products (mechanical constructions) include but are not limited to tubes, components for cars or planes, bicycle frames, plates and even shielding plates, trucks, wind mills, all types of sports articles such as ski's and the like, tennis-, squash-, badminton rackets, snow-boards, skate-boards, surfboards and the like, fishing material and fish lines, matrices or molds, etc.

Because the construction material obtained according to the invention is very smooth prior to undergoing an additional treatment, it can be used in many manufacturing processes, without having to rely on heavy presses, such as for the punching or pressing of steel or the like.

In another aspect, the invention therefore also relates to a structural material for plates and/or beams and/or tubes, made from the construction material according to the invention. An advantageous application of such construction material, because of its very good mechanical and physical properties, is as structural material for plates and/or beams and/or tubes or for applications which are difficult from a mechanical point of view, such as bicycle tubes or bicycle frames. The E-modulus of the obtained material is comprised between 30 Gpa and 80 Gpa, and preferably 100 Gpa. The invention also relates to bicycle tubes or construction beams made from the construction material according to the present invention.

EXAMPLES

Hereunder, a number of embodiments according to the invention are exemplified.

A first example relates to a bicycle tube which is made of a thermosetting or thermoplastic polymer composite according to the invention. The bicycle tube consists of a (laminate) material that comprises an inner, intermediate and outer layer. The characteristics of the separate layers are represented in Table 1.

TABLE 1

| Composition from outside to inside | N° of layers | Description of the layers | Orientation of the angles of the layers | weight of the fibers in prepreg/m$^2$ |
|---|---|---|---|---|
| outer layer | 2 to 4 | layers unidirectional carbon fiber epoxy (prepreg) | between 0° and 45° (+/−) | between 50 and 350 gram |
| intermediate layer | 2 | layers unidirectional flax fiber epoxy (prepreg) | between 0° and 45° (+/−) | between 50 and 800 gram |
| inner layer | 2 to 4 | layers unidirectional carbon fiber epoxy (prepreg) | between 0° and 45° (+/−) | between 50 and 350 gram |

Wall thicknesses are comprised between 1 and 3 mm. Above-mentioned layers make up the composition of a bicycle tube, which are subsequently wound up and placed in a mold. Using a pressure of between 1 and 80 bar and a temperature of between 20° C. and 200° C. the product is hardened. Hardening time may vary between 2 and 30 minutes.

A second example relates to a plate which is manufactured from thermosetting or thermoplastic polymer composites that are reinforced with natural fibers according to the invention. The plate consists of a laminate material that comprises an outer, intermediate and outer layer. Both outer layers consist of 2 to 20 layers of unidirectional carbon fiber epoxy (prepreg) or carbon fabric epoxy (prepreg). The intermediate later comprises 2 to 100 layers of unidirectional flax fiber epoxy (prepreg) or flax fabric epoxy (prepreg). The characteristics of the separate layers is represented in Table 2.

TABLE 2

| Composition | N° of layers | Description of the layers | Orientation of the angles of the layers | weight of the fibers in prepreg/m$^2$ |
|---|---|---|---|---|
| outer layer | 2 to 20 | layers unidirectional carbon fiber epoxy (prepreg) | between 0° and 90° (+/−) | between 50 and 350 gram |
| | | Layers carbon fabric epoxy (prepreg) | | between 200 and 700 gram |
| intermediate layer | 2 to 100 | layers unidirectional flax fiber epoxy (prepreg) | between 0° and 90° (+/−) | between 50 and 800 gram |
| | | Layers flax fabric epoxy (prepreg) | | between 200 and 700 gram |
| outer layer | 2 to 20 | layers unidirectional carbon fiber epoxy (prepreg) | between 0° and 90° (+/−) | between 50 and 350 gram |
| | | Layers carbon fabric epoxy (prepreg) | | between 200 and 700 gram |

Plate thicknesses are comprised between 3 and 100 mm. Plates can be made is a press or an autoclave. Temperatures, treatment times and pressures are hereby comparable to those mentioned for the manufacturing of bicycle tubes.

What is claimed is:

1. A method for preparing a composite reinforced with natural fibers, comprising:
    contacting a cellulose- or hemicellulose-containing material with a binding material in the presence of a carrier solvent or a carrier emulsion for a duration of time sufficient to cause absorption and adsorption of the binding material to and in the cellulose- or hemicellulose-containing material; and
    further processing of the contacted cellulose- or hemicellulose-containing material to form a composite reinforced with natural fibers and containing 30 to 85 volume percent of the binding material;
    wherein the binding material is a thermosetting resin, a thermoplastic resin or an elastomer;
    wherein the cellulose- or hemicellulose-containing material completely or essentially consists of natural fibers having an average diameter between 1 μm and 4 mm; and
    wherein the carrier solvent and the carrier emulsion comprise one or more alcohols and one or more ketones.

2. The method according to claim 1, wherein the binding material is biodegradable or non-biodegradable.

3. The method according to claim 1, wherein the cellulose- or hemicellulose-containing material is provided with one or more additives, said additives being selected from the group consisting of anti-aging compounds, anti-flammable compounds, UV-resistance compounds and combinations thereof.

4. The method according to claim 1, wherein the cellulose- or hemicellulose-containing material essentially consists of a flax product.

5. The method according to claim 4, wherein the flax product is selected from green flax, retted flax, flax in bulk, flax in ribbons, flax in wicks, and flax in yarns;
- wherein the yarns include simple yarns, yarns that are spun in textile structures, and twined yarns; and
- wherein the textile structures include non wovens, fabrics, knitted fabrics, braid fabrics, laid fabrics, and ties, which are unidirectional or multidirectional.

6. The method according to claim 1, wherein the alcohols and ketones comprise 1 to 12 carbon atoms.

7. The method according to claim 1, wherein the thermosetting resin or the thermoplastic resin is selected from the group consisting of epoxy resins, epoxy resins mixed with a hardener, polyesters, vinyl esters, polyurethanes, furan resins, silicones, polyolefins, poly (vinyl chloride) (PVC), styrene polymers, polyamides, polyacrylates, polycarbonates and combinations thereof;
- wherein the polyolefins include polyethylene and polypropylene; and wherein the styrene polymers include polystyrene, styrene acrylonitrile, and acrylonitrile-butadiene-styrene.

8. The method according to claim 1, wherein the thermosetting resin comprises a monomer.

9. The method according to claim 1, wherein the thermosetting resin is selected from an epoxy resin, an epoxy resin mixed with a hardener, and an epoxy resin mixed with a hardener and a catalyst.

10. The method according to claim 1, wherein the further processing of the contacted cellulose- or hemicellulose-containing material comprises releasing excess carrier solvent or carrier emulsion from the contacted cellulose- or hemicellulose-containing material.

11. The method according to claim 10, wherein the excess carrier solvent or carrier emulsion is released from the contacted cellulose- or hemicellulose-containing material at a temperature from room temperature to 200° C.

12. The method according to claim 1, wherein the cellulose- or hemicellulose-containing material is mixed with another fiber, selected from aramide fiber, ceramic fiber, metal fiber, glass fiber, polyethylene fiber, polyester fiber, carbon fiber, and another natural fiber.

13. The method according to claim 1, further comprising treating the composite with a thermosetting resin or an elastomer, provided with a hardener.

* * * * *